United States Patent

Larsson et al.

(10) Patent No.: US 8,244,190 B2
(45) Date of Patent: Aug. 14, 2012

(54) MULTI-ANTENNA RELAY WITH SELF-INTERFERENCE CANCELLATION

(75) Inventors: Peter Larsson, Solna (SE); Mikael Prytz, Ronninge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 895 days.

(21) Appl. No.: 12/307,259

(22) PCT Filed: Jul. 3, 2006

(86) PCT No.: PCT/SE2006/000829
§ 371 (c)(1),
(2), (4) Date: Dec. 31, 2008

(87) PCT Pub. No.: WO2008/004916
PCT Pub. Date: Jan. 10, 2008

(65) Prior Publication Data
US 2010/0272005 A1     Oct. 28, 2010

(51) Int. Cl.
*H04B 1/44* (2006.01)
(52) U.S. Cl. ............... 455/78; 455/7; 455/11.1; 455/15; 455/16; 455/24
(58) Field of Classification Search ............ 455/7, 11.1, 455/13.1, 13.3, 15, 16, 24, 78, 80; 370/315, 370/316, 278, 293
See application file for complete search history.

(56) References Cited

U.S. PATENT DOCUMENTS

| | | | |
|---|---|---|---|
| 5,835,848 A | 11/1998 | Bi et al. | |
| 5,963,847 A | 10/1999 | Ito et al. | |
| 6,061,548 A | 5/2000 | Reudink | |
| 6,385,435 B1 | 5/2002 | Lee | |
| 6,745,003 B1 | 6/2004 | Maca | |
| 7,280,604 B2 * | 10/2007 | Giannakis et al. | 375/260 |

(Continued)

FOREIGN PATENT DOCUMENTS
EP        1 538 762 A2     6/2005
(Continued)

OTHER PUBLICATIONS

International Search Report Written Opinion dated May 8, 2007 (13 pages).

(Continued)

*Primary Examiner* — Fayyaz Alam
(74) *Attorney, Agent, or Firm* — Myers Bigel Sibley & Sajovec, P.A.

(57) ABSTRACT

A wireless relay node (100) comprises a receiving side (110) and a transmitting side (120) adapted for concurrent reception and transmission of an information stream, and at least one of the two sides has multiple antennas for multi-antenna operation. In the internal design, the wireless relay node is further configured (130) for cancelling signal feedback from a multi-antenna dependent feedback channel from the transmitting side to the receiving side based on an N×M dimensional filter matrix (135) dependent on the multi-antenna dependent feedback channel, where at least one of N and M is greater than 1. In this way, self-interference cancellation of a multi-antenna dependent feedback signal from the output to the input of the wireless relay node is effectively obtained.

14 Claims, 10 Drawing Sheets

U.S. PATENT DOCUMENTS

| | | |
|---|---|---|
| 2002/0118771 A1 | 8/2002 | Larsson |
| 2003/0124976 A1* | 7/2003 | Tamaki et al. .................. 455/15 |
| 2003/0129476 A1* | 7/2003 | Ovshinsky ...................... 429/40 |
| 2005/0014464 A1 | 1/2005 | Larsson |
| 2005/0130587 A1* | 6/2005 | Suda et al. ........................ 455/9 |
| 2005/0190822 A1* | 9/2005 | Fujii et al. ..................... 375/211 |

FOREIGN PATENT DOCUMENTS

| | | |
|---|---|---|
| EP | 1 566 900 A2 | 8/2005 |

OTHER PUBLICATIONS

IPER dated Sep. 4, 2008 (7 pages).

Bellanger, Maurice G. "Adaptive Digital Filters" Second Edition, Revised and Expanded, New York, NY, pp. 1-450, 2001.

Laneman, J. Nicholas "Cooperative Diversity in Wireless Networks: Algorithms and Architectures" Ph.D. Thesis, Massachusetts Institute of Technology, Cambridge, MA., pp. 1-187, Aug. 2002.

* cited by examiner exists. However, the idea of multi-hop networking can also be applied when nodes are fixed and/or a central coordinating infrastructure exists. One such scenario targets rural area Internet access and uses fixed nodes attached to the top of house roofs, lamp posts and so forth.

MULTI-ANTENNA RELAY WITH SELF-INTERFERENCE CANCELLATION

TECHNICAL FIELD

The present invention generally relates to wireless networks, and especially to wireless relaying networks and related network components.

BACKGROUND

It is important that future wireless and/or cellular systems can offer, apart from many other aspects, increased coverage, higher data rates or a combination of both. In addition, the cost aspect of building and maintaining the system is expected to become even more important in the future. As data rates and/or communication distances are increased, the problem of increased battery consumption also needs to be addressed.

An important aspect is rethinking the topology used in existing systems, as there has been little change of topology over the three generations of cellular networks. In this respect, the introduction of so-called relaying networks, such as multi-hop networks and two-hop relaying networks, has been a great leap in the right direction.

For instance, it is well known that so called multi-hopping offers possibilities of significantly reduced path loss between communicating (relay) entities, which may benefit the user. When routing is applied in a wireless communication network, such a network is often denoted a multi-hop network. In a multi-hop network, nodes or stations out of reach from each other can benefit from intermediately located nodes that can forward their messages from the source node towards the destination node. Traditionally, multi-hop networks have been associated with so called ad hoc networks, where nodes are mostly mobile and no central coordinating infrastructure exists. However, the idea of multi-hop networking can also be applied when nodes are fixed and/or a central coordinating infrastructure exists. One such scenario targets rural area Internet access and uses fixed nodes attached to the top of house roofs, lamp posts and so forth.

In a multi-hop scenario, information may be transmitted over multiple hops between source and destination rather than directly in a single hop. In general, the multi-hop approach offers several advantages such as lower power consumption and higher information throughput compared to a direct one-hop approach. In a multi-hop network, nodes out of reach from each other can benefit from intermediately located nodes that can forward their messages from the source towards the destination.

A related approach to provide enhanced coverage and data rate is to use so-called two-hop relaying, which could be viewed as a degenerate case of multi-hopping involving only two hops, but at the same time generalized to and allowing for parallel paths if desired. Many different variants of two-hop relaying exist.

In a specific form of two-hop relaying, a transmitter sends a signal to a relay, which receives the message and then forwards it to a receiver, either by regenerative relaying (decode-and-forward) or non-regenerative relaying (amplify-and-forward). A major benefit of two-hop relaying stems from splitting a long transmission distance into two roughly equidistant hops to allow increased data rate on each link as well as increased end-to-end (ETE) total data rate.

In another form of two-hop relaying, a transmitter sends a signal to a receiver, but also to a relay, which receives and forwards the message to the receiver. The receiver then combines the first direct signal and the second relayed signal to enhance the quality of the signal, which means increased average data rate (and less variance due to diversity). This form of relaying is sometimes referred to as cooperative relaying.

A more elaborate form of cooperative relaying, however, employs various aspects of "cooperation" among several relay nodes. For example, a signal sent by a transmitting node may first be received by multiple relays, and subsequently and concurrently forwarded, and finally received by a receiving node.

In cooperative relaying, the relays are generally allowed to perform various signal processing or coding tasks that in different ways improve the overall communication performance. The benefits of the mechanisms that are exploited in cooperative relaying can broadly be divided into diversity gain, beam-forming gain, and spatial multiplexing gain. Also here, the receiver could enhance the quality of the signal by combining the direct signal and the relayed signals.

In recent research literature, cooperative relaying goes under several names, such as cooperative diversity, cooperative coding, virtual antenna arrays, and so forth. A good general overview of cooperative communication schemes is given in reference [1]. The general benefits of cooperation between stations or nodes in wireless communication can be summarized as higher data rates, reduced outage and variance (due to various forms of diversity), increased battery lifetime and extended coverage.

The use of traditional repeaters can also be considered as two-hop relaying in its simplest form. A repeater is often a relatively simple relay node, which only offers fairly rudimentary functions such as amplify-and-forwarding and perhaps power control. The boundary between repeaters and more advanced relays is, however, not sharp. The terms "relay" and "repeater" are often (and will also here be) used interchangeably.

An example of a traditional two-hop relay system is shown in FIG. 1. The two-hop relay system or network basically comprises a transmitter (TX) 10, a receiver (RX) 30, and one or more relay stations (RS) 20. When the number V of relays is greater than one, or alternatively, when both a direct signal and a relayed signal are exploited, this represents the cooperative relaying case.

There is a general demand for improved performance of relaying networks and the involved relay components.

SUMMARY

The present invention overcomes these and other drawbacks of the prior art arrangements.

It is a general object of the present invention to improve the performance of wireless relaying networks and related network components.

In particular it is desirable to provide an improved wireless relay node for increased data rate and/or more efficient use of available power/energy resources.

These and other objects are met by the invention as defined by the accompanying patent claims.

A main aspect of the invention concerns the internal design of a wireless relay node, which comprises a receiving side and a transmitting side adapted for concurrent reception and transmission of an information stream, and where at least one of the two sides has multiple antennas for multi-antenna operation. The wireless relay node is further configured for cancelling signal feedback from a multi-antenna dependent feedback channel from the transmitting side to the receiving side based on an N×M dimensional filter matrix dependent on the multi-antenna dependent feedback channel, where at least one of N and M is greater than 1.

In this way, self-interference cancellation of a multi-antenna dependent feedback signal from the output to the input of the wireless relay node is effectively obtained.

The invention is also related to a filter for providing the self-interference cancellation of a multi-antenna dependent feedback signal and a method of designing such a filter.

The invention naturally also covers a wireless relaying network comprising a wireless relay node according to the invention.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figure 1:
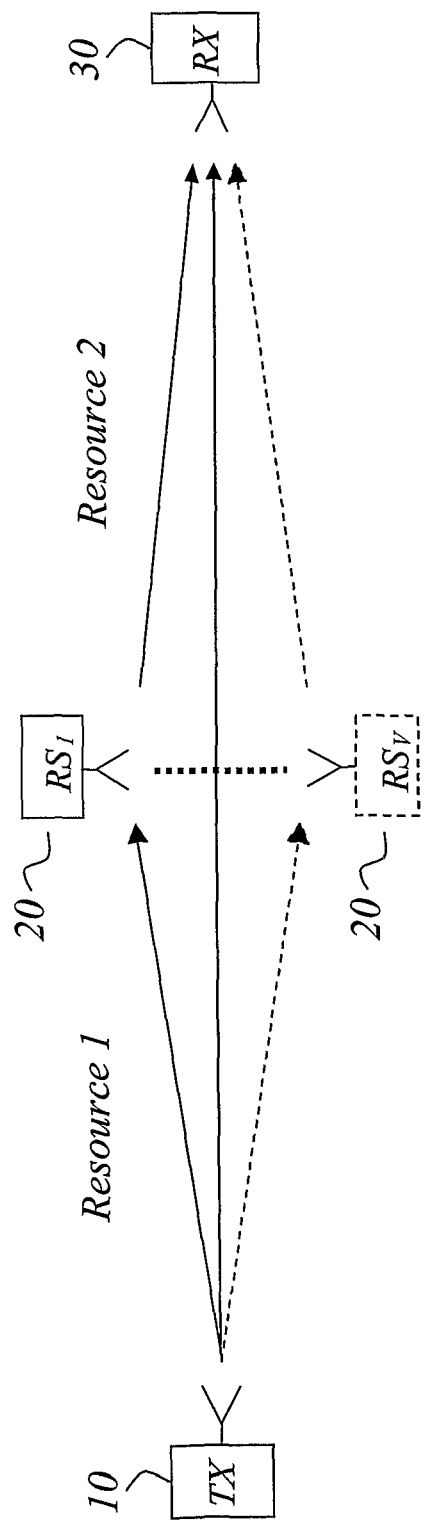
FIG. 1 is a schematic diagram illustrating an example of a traditional two-hop relay system.

Throughout the drawings, the same reference characters will be used for corresponding or similar elements.

For a better understanding of the invention it may be useful to begin with an analysis of the traditional relaying schemes. The inventors have recognized that the existing (two-hop) relaying schemes suffer from several drawbacks.

Traditional (two-hop) relaying schemes typically assume a two-phase scheme, i.e. information is first sent to the relay(s) in a first phase, and then in a second subsequent phase, information is forwarded to the receiver. This two-phase approach reduces the benefits achieved by the relaying itself, since it takes two "time slots" to transmit the information.

In systems where MIMO (Multiple Input Multiple Output) based communication is used between a sending and a receiving node, it is vital that the relay operates in a MIMO communication friendly manner, e.g. by not unnecessarily acting as a so-called "key-hole" that degenerates the rank of the end-to-end channel.

If a relay is experiencing strong interference, it is undesirable to forward the interference. A problem is that current relay or repeater techniques typically do not have the ability to discriminate the interference at all or to an acceptable level.

A basic idea of the invention is to provide an integrated design of concurrent reception and transmission and multiple antennas that also allows for self-interference cancellation of a multi-antenna dependent feedback from the output to the input of the wireless relay node.

In the invention, the receive side and transmit side of the relay may use the same or different number of antennas, and at least one of the two sides use multiple antennas. Now, a basic idea is to design the multiple antenna relay for concurrently receiving and forwarding a signal, while concurrently also canceling the multi-antenna dependent signal feed-back from the relay output to the input. In other words, it is desirable to perform self-interference cancellation of the transmitted signal, while accounting for the MIMO/MISO/SIMO like channel seen between the relay's output-to-input antennas.

So-called on-frequency repeaters that receive and transmit concurrently on the same frequency exist today, using self-interference cancellation, but with only a single receive and a single transmit antenna, which is a far less complex scenario than the multi-antenna enabled interference-cancellation design proposed by the invention. Examples of on-frequency repeaters with a simple form of self-interference cancellation without multiple antennas have been described in references [2-6]. A number of companies also offer this type of simple on-frequency repeaters, such as Andrew [7], RF Window [8], Juni [9], JAS Teletech [10], Innoace [11], Empower RF [12], MMC Technology and Allen (MIKOM).

The concept of equipping repeaters or relays with multiple antennas is known as such, see e.g. reference [13]. However, the self-interference-cancellation aspect is not considered in this reference.

Figure 2:
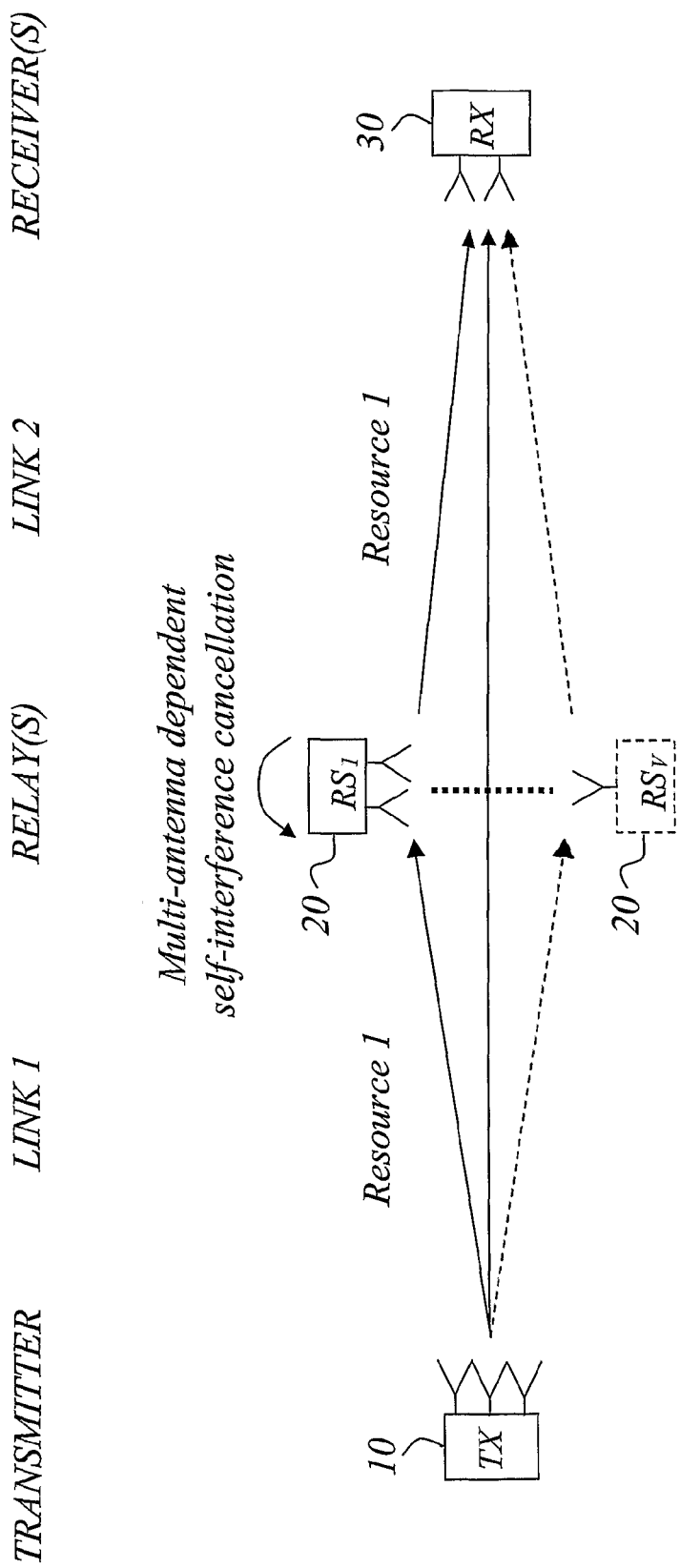
FIG. 2 is a schematic diagram illustrating an example of a wireless relay system of a preferred embodiment of the invention.

With reference to the particular example of FIG. 2, in the exemplary context of two-hop relaying, it can be appreciated that the invention provides one or more relay stations (RS) 20 with multiple antennas. This or these relay stations is/are configured for concurrently receiving and transmitting an information stream/signal. The received information stream may be a single stream or composed of multiple sub-streams, such as Multiple Input Multiple Output (MIMO) sub-streams.

Normally, the relay station(s) is adapted for concurrently receiving and forwarding a signal within the same frequency band (substantially using one and the same frequency resource on the first link and second link). This may lead to substantial self-interference from the output to input of the relay station(s).

Alternatively, the relay station may be receiving in a first frequency band and transmitting in a second different frequency band, while there may still be some degree of interference coupling between the frequency bands resulting in self-interference.

In any case, the relay station or stations is/are configured for canceling the multi-antenna dependent signal feed-back from the relay output to the input. Preferably, the transmitting node 10 and/or the receiving node 30 are also provided with multiple antennas for exploiting spatial multiplexing based communication.

For example, the relaying nodes may be on-frequency repeating relay stations, each of which receives the signal and with a latency substantially smaller than the OFDM (Orthogonal Frequency Division Multiplexing) symbol duration forwards the signal in the same frequency band. The originating transmitting node may further be configured with a cyclic prefix duration adapted to the power delay profile of the equivalent channel of the relayed signal and the direct signal to ensure concurrent reception and constructive interference (an enhanced form of cooperative relaying) at the receiving node.

The invention is not limited to two-hop relaying networks, but is also applicable in multi-hop networks.

For a better understanding, the invention including various optional extensions thereof will now be described in more detail with reference to a number of exemplary embodiments of the internal design of a relay station/node.

Figure 3:
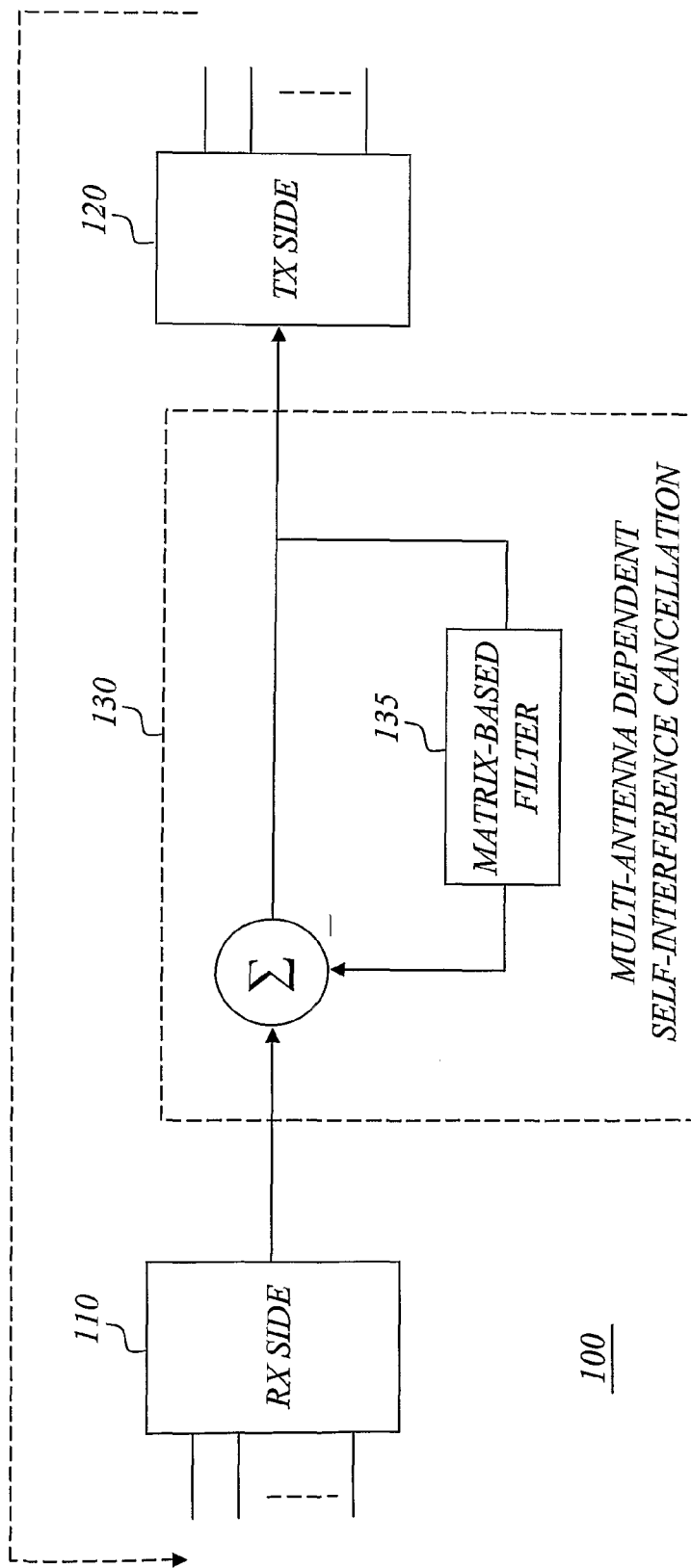
FIG. 3 is a schematic block diagram illustrating an example of a relay-internal design according to a preferred embodiment of the invention.

FIG. 3 is a schematic block diagram illustrating an example of a relay-internal design according to a preferred embodiment of the invention.

The relay 100 basically comprises a receiving side 110 and a transmitting side 120, at least one of which comprises more than one antenna. This means that there is a multi-antenna dependent output-to-input feedback channel from the transmitting side 120 to the receiving side 110. If both the receiving and transmitting sides employs multiple antennas the output-to-input feedback channel is a MIMO like "channel". If only one of the sides have multiple antennas, the feedback channel will be a SIMO/MISO like "channel". Either way, the relay 100 also comprises a module 130 for multi-antenna dependent self-interference cancellation, which emulates the external output-to-input feedback channel for cancelling the influence of the feedback channel on the relayed signal. The self-interference cancellation module 130 is configured for effectuating the self-interference cancellation based on a N×M dimensional filter matrix dependent on the multi-antenna dependent feedback channel, where at least one of N and M is greater than 1. Preferably, the self-interference cancellation module 130 comprises a filter 135 implementing the N×M dimensional filter matrix. The matrix-based filter 135 is generally arranged in an internal feedback path in connection with a forward path between the transmitting side 110 and the transmitting side 120.

Preferably, the multi-antenna dependent feedback channel is estimated and represented by a $N_1 \times N_2$ dimensional channel matrix, where at least one of $N_1$ (the number of receive antennas at the input) and $N_2$ (the number of transmit antennas at the output) is greater than 1. Normally, although not necessarily, $N_1$ is equal to or greater than $N_1$ and $N_2$ is equal to or greater than M.

The relay may be used in a two-hop relaying network, or in a multi-hop network. The relay may operate as a standalone unit, or jointly together with other relay/repeater nodes in a so-called (cooperative) relaying network.

The relay may for example be a multi-antenna on-frequency repeater/relay, which receives the signal and transmits it immediately on the "same frequency" (at least within the same frequency band) while still receiving, and at the same time provides multi-antenna enabled self-interference cancellation. However, as previously mentioned, the relay may alternatively be using frequency translation receiving at one frequency band and transmitting at another frequency band, while still having interference coupling between the frequency bands to justify the proposed solution of multi-antenna dependent self-interference cancellation.

Figure 4:
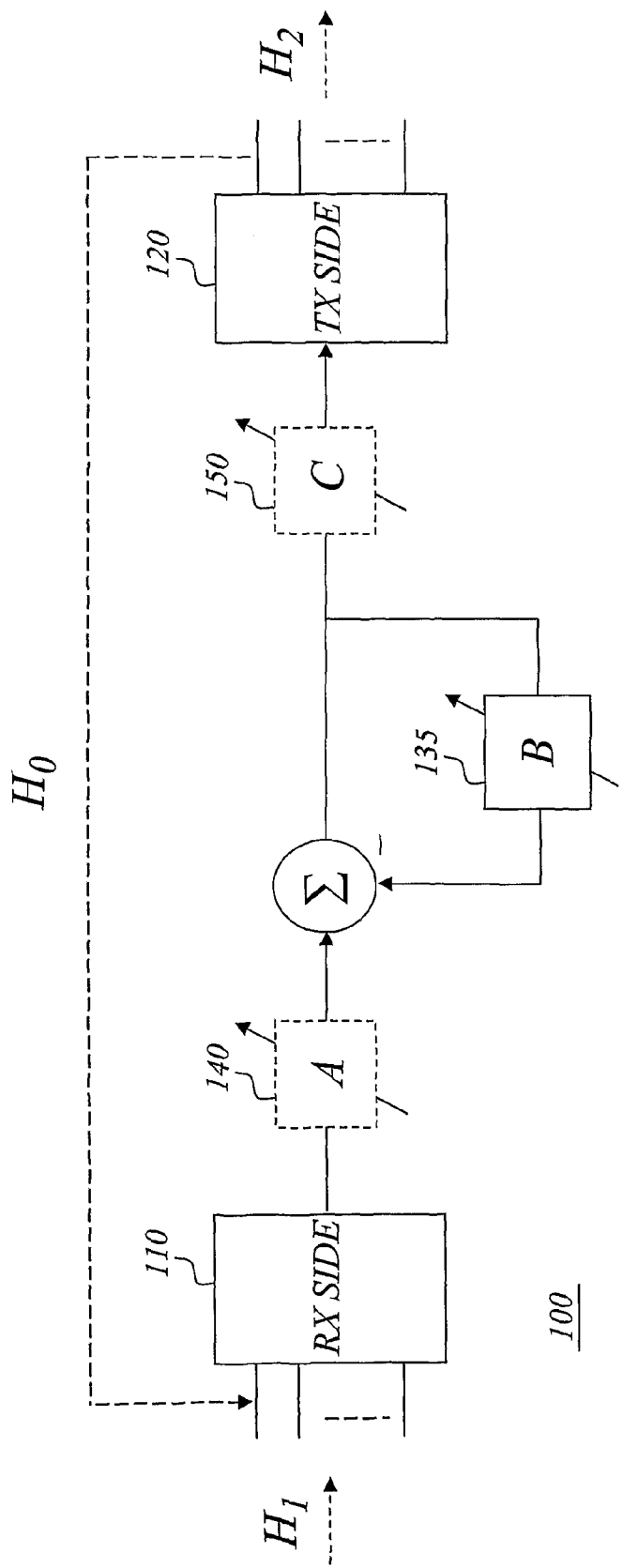
FIG. 4 is a schematic block diagram illustrating an example of a relay-internal design with signal processing in the forward path according to a preferred embodiment of the invention.
Figure 5:
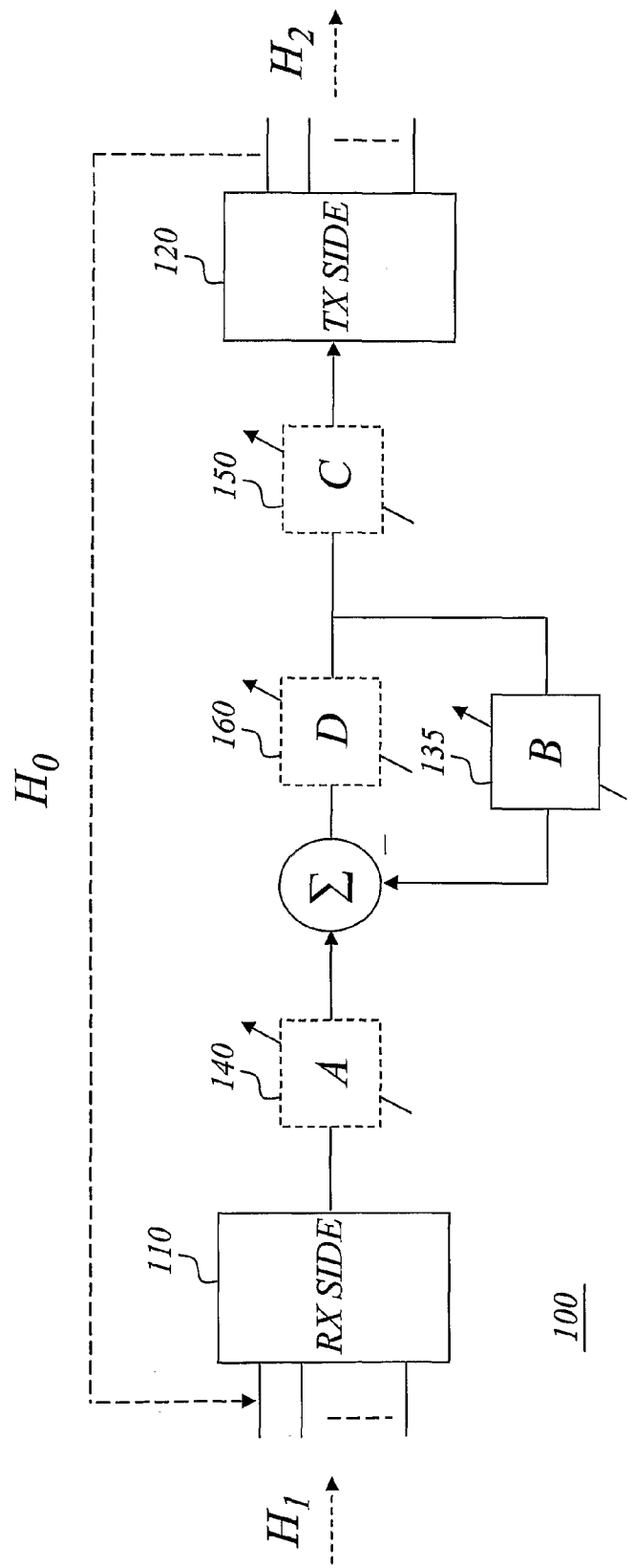
FIG. 5 is a schematic block diagram illustrating an example of a relay-internal design with signal processing in the forward path according to another preferred embodiment of the invention.

In a further optional aspect of the invention, the signal may be processed at the receiving side and/or the transmitting side of the relay for performance enhancement, as will be exemplified with reference to FIGS. 4 and 5.

For example, the enhancement may be based on beam-forming, interference suppression, interference mitigation, noise enhancement avoidance, sum-eigenvalue/rank/determinant maximization, ETE-MIMO channel capacity maximization (for TX-RS-RX), or a combination thereof.

FIG. 4 is a schematic block diagram illustrating an example of a relay-internal design with signal processing in the forward path according to a preferred embodiment of the invention. In this particular example, the relay node further comprises one or more modules 140, 150, also denoted by A and C, for signal processing arranged in the forward path, on the receiving and/or transmitting side. Preferably, the filter matrix for self-interference cancellation 135, denoted by B, is also dependent on the transfer function(s) of the signal processing modules A and/or C.

As mentioned above, various types of signal processing may be performed by the modules 140, 150. Normally, but not necessarily, the signal processing module(s) is/are provided in the form of an antenna weight matrix or matrices, which may be adapted for signal-to-noise ratio (SNR) enhancements, e.g. through beam-forming on the TX-RS link, the RS-RX link or both, and/or suppression of signal dimensions having low SNR or no power at all of the desired signal.

For example, there may be an antenna weight matrix A for the receiving side antennas. This antenna weight matrix is preferably adapted at least partly in dependence on the channel matrix between the transmitting node and the relay node. The antenna weight matrix may also be adapted for suppressing interference from other nodes.

Alternatively, or as a complement, there may be an antenna weight matrix C for the transmitting side antennas. The transmitting side antenna weight matrix is preferably adapted at least partly in dependence on the channel matrix between the relay node and the receiving node. The antenna weight matrix may also be adapted for the purpose of interference mitigation.

As indicated, the relay 100 may include both an antenna weight matrix for the receiving side and an antenna weight matrix for the transmitting side. In this case, it is for example possible to select the antenna weight matrices so as to optimize performance (e.g. end-to-end capacity) of the (e.g. MIMO-based) communication between the transmitting node and the receiving node (via the relay node) or to avoid channel rank deficiency.

In a further aspect of the invention, that can be used independently of the multi-antenna enabled self-interference cancellation, the signal received at the receiving side is a MIMO signal with a dimensionality greater than 1 (multiple MIMO sub-streams) and this MIMO signal is processed in the relay such that the dimensionality of the processed signal for transmission at the transmitting side is at least greater than 1. This represents some form of "rank" or dimensionality preservation. Even though the dimensionality may be somewhat reduced from the input side to the output side of the relay node, the "multi-channel information" of the input signal will at least not be completely removed on the way through the relay node. In other words, the relay node may receive a MIMO signal having multiple MIMO sub-streams, and the received MIMO signal is then processed in the relay node in such a way that the number of MIMO sub-streams of the processed signal for transmission is at least greater than 1.

FIG. 5 is a schematic block diagram illustrating an example of a relay-internal design with signal processing in the forward path according to another preferred embodiment of the invention. This embodiment is similar to that of FIG. 4, but in addition illustrates the possibility to add further signal processing modules in the forward path of the relay station. For example, the added processing module 160, also denoted by D, may be configured for compensating for potential phase delays over the leads between the input side and the output side.

The integrated design of concurrent reception and transmission of a signal (e.g. on-frequency operation), and multiple antennas and self-interference cancellation caters for highly MIMO-friendly operation since in addition to the multi-antenna enabled self-interference cancellation procedure the antenna weight matrices can also be adapted for beam-forming gain, interference suppression, interference mitigation, noise enhancement avoidance, rank maximization, channel capacity maximization or combinations thereof.

Hence, the combined benefit of avoiding any duplex loss and the use of multiple repeater/relay antennas provides enhanced ETE-throughput and/or more efficient use of power/energy resources. Moreover, the use of the relay/repeater is transparent from system point of view, making it applicable in existing as well as future wireless systems.

Figure 6:
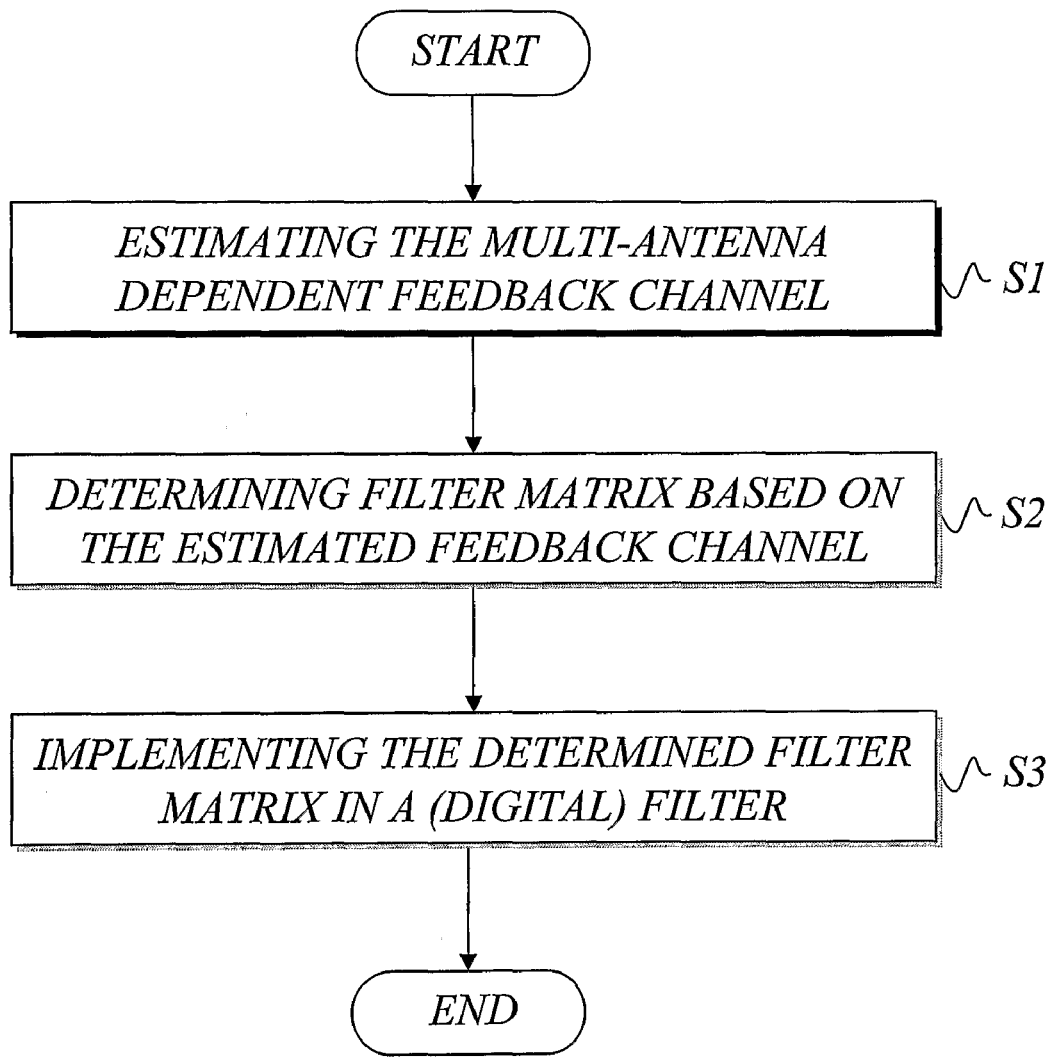
FIG. 6 is a schematic flow diagram of a method for designing and implementing a self-interference cancellation filter according to a preferred embodiment of the invention.

FIG. 6 is a schematic flow diagram of a method for designing and implementing a self-interference cancellation filter according to a preferred embodiment of the invention. In step S1, an estimate of the multi-antenna dependent feedback channel is determined, e.g. based on pilot transmissions or by other means. The estimate of the feedback channel may for example be represented by a channel matrix. Next, a filter matrix is determined based on the estimated feedback channel in step S2. Finally, in step S3, the determined filter matrix is implemented in a real filter, such as a hardware-implemented filter or a filter implemented in a digital signal processor or equivalent processing module.

For a more in-depth understanding, the invention will now be described with reference to a particular example of a model of the internal relay design.

Figure 7:
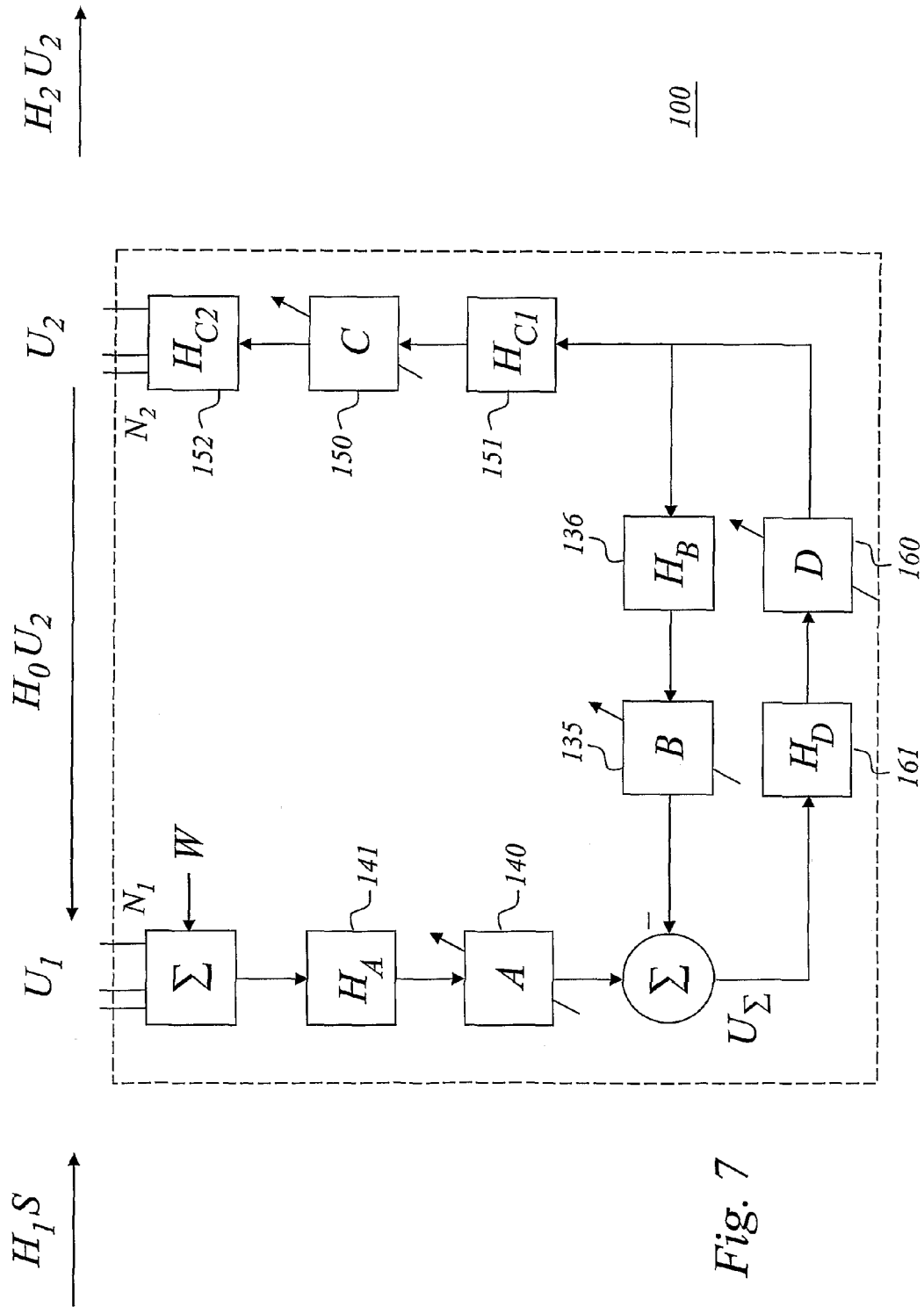
FIG. 7 is a schematic diagram illustrating a detailed example of a model of the relay-internal design according to a particular embodiment of the invention.

FIG. 7 is a schematic diagram illustrating a detailed example of a model of the relay-internal design according to a particular embodiment of the invention.

While the following exemplary analysis/operation for simplicity and brevity is illustrated in the frequency domain, it should be understood that the corresponding operation could be performed in the time domain, yet with a correspondingly modified architecture.[1] While the operation is mainly shown for base-band, customary RF functions (like mixers, RF-amplifiers, local oscillators etc.) are of course provided in a real implementation. Moreover, the overall architecture of FIG. 7 is intended to be as general as possible in the sense that a plurality of options are illustrated and discussed. In practice, many of these options may be removed and hence any implementation may be simplified.

[1] If the channel can be considered to be flat, i.e. insignificant delay spread, the time domain and the frequency domain architecture are identical.

The frequency domain transfer function is now derived. For each angular frequency $\omega$ one has the following matrix relations:

$$U_\Sigma = AH_A(U_1+W) - BH_B DH_D U_\Sigma,$$

$$U_2 = H_{C2} CH_{C1} DH_D U_\Sigma$$

$$U_1 = H_1 S + H_0 U_2,$$

where $U_1 \in C^{N_1 \times 1}$ is the (complex-valued) vector-signal experienced at the relay $N_1$ antenna inputs, $U_2 \in C^{N_2 \times 1}$ is the (complex-valued) vector-signal experienced at the relay $N_2$ antenna outputs, $W \in C^{N_1 \times 1}$ is the noise (plus interference), S is a (complex-valued) vector-signal carrying data with entries selected from a signal constellation, $H_A$, $H_B H_{C1} H_{C2}$ and $H_D$, denoted by reference numerals 141, 136, 151, 152, 161, are relay internal (complex-valued) matrix transfer functions (typically mainly with a frequency dependent phase factor due to delays, and essentially flat magnitude), A, B, C and D, denoted by reference numerals 140, 135, 150, 160, are (typically complex-valued) filter matrices that can be tuned to ensure self-interference cancellation (B) as well as optionally offering an overall desired operation (A, C and D) of the relay. For example, A and C may be antenna weight matrices as previously discussed. Moreover, $H_o$ is the channel matrix (or vector) between the repeater output and input, $H_1$ is the transmitter node-repeater channel (link 1), and $H_2$ is the repeater-receiver node channel (link 2).

The matrix-based transfer functions $H_A$, $H_B$, $H_{C1}$, $H_{C2}$ and $H_D$ normally represents deviations from the ideal internal operation such as delays, phase shifts, and/or damping present in a real implementation.

Note that in a digital implementation, one does generally not induce any amplitude variation in $H_B H_{C1}$ and $H_D$, though phase shifts will arise due to processing delay. Hence, those matrices generally have the form of diagonal matrices with unit value phase factors on the diagonal.

Figure 8A:
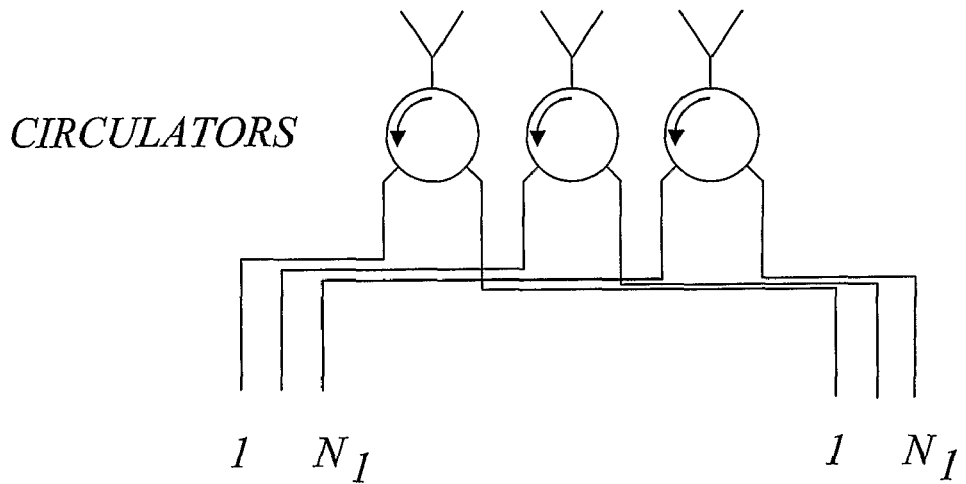
FIGS. 8A-B are schematic diagrams illustrating the two cases when the transmitting side and receiving side use the same set of antennas and different sets of antennas, respectively.
Figure 8B:
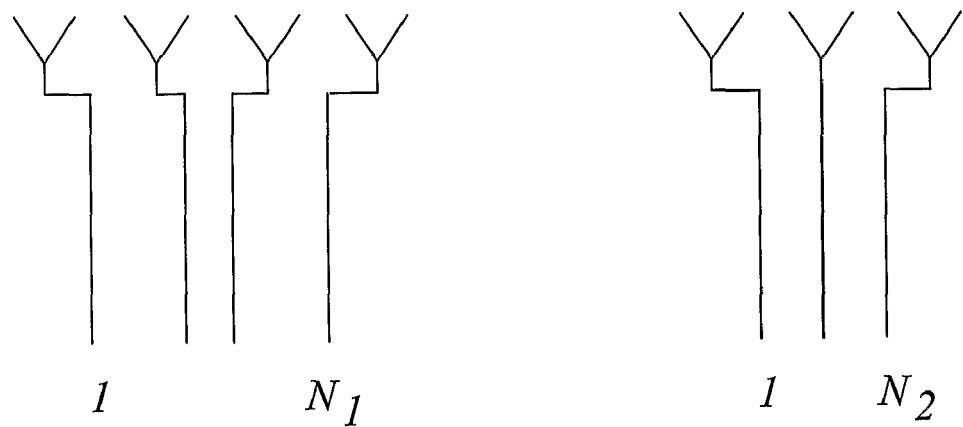

With reference to FIGS. 8A-B it can be noted that the number of input and output antennas $N_1$ and $N_2$ could be identical (FIG. 8A) $N_1=N_2$, e.g. if the same set of antennas is used in combination with circulators or alternatively with 3-dB hybrids/directional couplers, but could also be different (FIG. 8B) $N_1 \neq N_2$, e.g. if different sets of antennas are used. A fundamental assumption of the invention is that max $\{N_1, N_2\} > 1$.

While the system of equations is easy to solve, the total expression cannot be written in a very compact form (since we allow for $N_1 \neq N_2$). Therefore, the system may alternatively be described, and for analytical purpose solved[2], in both the internal signal $U_\Sigma$ and the output signal $U_2$:

[2] This comes at the expense of maintaining a larger factorization and computing the auxiliary variables.

$$\begin{pmatrix} I + BH_B DH_D & -AH_A H_0 \\ -H_{C2} CH_{C1} DH_D & I \end{pmatrix} \begin{pmatrix} U_\Sigma \\ U_2 \end{pmatrix} = \begin{pmatrix} AH_A(H_1 S + W) \\ 0 \end{pmatrix} \quad (1)$$

Note that (1) is solvable if the left-hand side matrix has an inverse. From FIG. 7, it is noted that the signal sent via the $AH_A H_0 H_{C2} CH_{C1}$ path should be canceled by the signal sent via the $BH_B$, i.e. to avoid that amplified signal traverse yet another round in the repeater. Hence, a condition for self-interference cancellation in the example of FIG. 7 can be given as:

$$BH_B = AH_A H_0 H_{C2} CH_{C1} \quad (2)$$

If this is substituted in (1) it can be seen that the Schur-complement of the lower right identity sub-matrix is also an identity matrix, which implies that (1) is solvable. Several important observations can be made from (2):

First, B depends on the channel matrix (or vector) between the repeater output and input.

Second, B may optionally also depend on one or several repeater internal matrices, $H_A$, $H_{C1}$, and $H_{C2}$.

Third, B may in yet another optional example depend on the input and output weighting matrices A and C. Since A and C may be adapted based on $H_1$ and $H_2$, B implicitly also depends on $H_1$ and $H_2$.

Inserting (2) in (1) (or by inspecting FIG. 7 and determining the transfer function when the feedback path is cancelled), the following expression is obtained:

$$U_2 = H_{C2} C H_{C1} D H_D A H_A (H_1 S + W),  \quad (3)$$

which means that the total transfer function for the relay is:

$$H_R = H_{C2} C H_{C1} D H_D A H_A. \quad (4)$$

As a preferred option, it may be desirable to use the smallest matrix dimensions for matrices in the architecture, in order to minimize the computational complexity. Then, the dimension for B and D is preferably equal or upper limited to min $\{N_1, N_2\} \times$ min $\{N_1, N_2\}$. Moreover, the computational complexity may be further limited by letting the matrix A reduce the dimensionality of the signal if the channel $H_1$ is rank deficient or if the vector S have less than $N_1$ uncorrelated entries. The dimensionality of A could, if desired, be adapted dynamically or designed based on expected $H_1$ channel rank and S vector size.

Now, when the condition for self-interference cancellation in the example of FIG. 7 has been stated, we proceed to discuss how the matrices A, C and D could be selected. This can be done in several ways, with different objectives, a few examples of which will be outlined below. The matrices D and $H_D$ were introduced for generality, but in the following it is assumed that D=I and $H_D$=I (transparent) for brevity. The objectives may for example be to attain beam-forming gain, suppress undesired interference, mitigating generation of undesired interference, avoiding rank reduction and so forth. These objectives may be strived for separately or in combination.

EXAMPLE

Enhanced Performance Based on Link 1 Channel

First, the matrix A may preferably be adapted to at least the channel $H_1$, and possibly also to the noise and interference covariance matrix $R_{WW} = E\{WW^H\}$ as well as the signal covariance matrix $R_{SS} = E\{SS^H\}$. In this example, $H_A$ may be included in $H_1$ or $H_A$=I (i.e. identity matrix). For example one may select A as an LMMSE (Linear Minimum Mean Squared Error) estimator $A = R_{SS} H_1^H (H_1 R_{SS} H_1^H + R_{WW})^{-1}$ (where $R_{SS}$ and $R_{WW}$ could be diagonal matrices, $R_{SS} = \sigma_S^2 I$ and $R_{WW} = \sigma_W^2 I$, if uncorrelated signals and noise are considered), or a least square estimator $A = (H_1^H H_1)^{-1} H_1^H$ (if $H_1$ has more rows than columns), or a zero-forcing estimator $A = H_1^{-1}$ (if $H_1$ is a square matrix and noise amplification is not too severe). If SVD-based MIMO is used over the first link with $[U_1 T_1 V_1^H] = \text{SVD}(H_1)$, where $U_1$ and $V_1$ are unitary matrices and $T_1$ is a matrix with the singular values arranged on the diagonal, $V_1$ is used at transmit side just prior channel $H_1$ but after S, and then A may also be adapted according to $A = U_1^H$ (but also the LMMSE setting of A should attain an equivalent solution). In the above, the performance is enhanced by increased signal to noise ratio due to beam-forming. The LMMSE solution also suppresses undesired interference from other users. Note, that undesired signals such as noise and interference can be suppressed by only using the rows of A that offer significant and sufficient signal to noise ratios. Also, the size of the vector S is important here, as the number of rows of A does not have to be greater than the number of uncorrelated entries in S.

EXAMPLE

Enhanced Performance Based on Link 2 Channel

Second, the matrix C may preferably be adapted to the channel $H_2$. In this example, $H_{C2}$ may be included in $H_2$ or $H_{C2}$=I (i.e. identity matrix). For example, one may select C as $C = H_2^H$, or a least square estimator $C = (H_2 H_2^H)^{-1} H_2$ (if $H_2$ has less rows than columns), or, if possible, a zero-forcing estimator $C = H_2^{-1}$ (if $H_2$ is a square matrix and noise amplification is not too severe)). If SVD-based MIMO is used over the second link, with $[U_2 T_2 V_2] = \text{SVD}(H_2)$ where $U_2$ and $V_2$ are unitary matrices and $T_2$ is a matrix with the singular values arranged on the diagonal, C may also be adapted as $C = V_2$. Moreover, the output power of the repeater may also be adapted to the noise and interference situation at the receiving node. Finally, C may also be adapted to avoid creating undesirable interference at one or more other users, here denoted as interference mitigation.

EXAMPLE

Enhanced (ETE) Performance

The matrix C may, in addition to adaptation to the channel $H_2$, also more specifically take the signal, noise and interference statistics prior matrix C into account. For instance, A may first be set to the LMMSE solution described above, and the matrix C can then be selected based on the resulting noise signal as well as the channel $H_2$. Also here, the output power of the repeater may be adapted. In this example, $H_{C2}$ may be included in $H_2$ or $H_{C2}$=I (i.e. identity matrix).

A possibility is also to select both A and C jointly, such that the overall (ETE) capacity (e.g. MIMO capacity) is maximized. For such optimization, some constraint is required, such as keeping the total transmitted power from the relay fixed or that the power on each relay antenna is kept fixed.

Considering the sum of both the direct and the relayed signal, the received signal $U_3$ at the receiving (RX) node 30, while optimizing the matrix A and C (possibly under some constraint), will then be:

$$U_3 = H_{Direct} S_1 + H_2 U_2 + W_2 \quad (5)$$

where $H_{Direct}$ is the channel matrix (directly) between the sending and receiving node. Clearly, multiple relay paths could also be considered in expression (5).

In order to optimize the ETE performance of (e.g. MIMO based) communication between a transmitting node and a receiving node, one should generally retain any high rank seen in the channels $H_1$ and $H_2$. The benefit of maintaining rank is that spatial multiplexing gain is not unnecessarily diminished.

Figure 9:
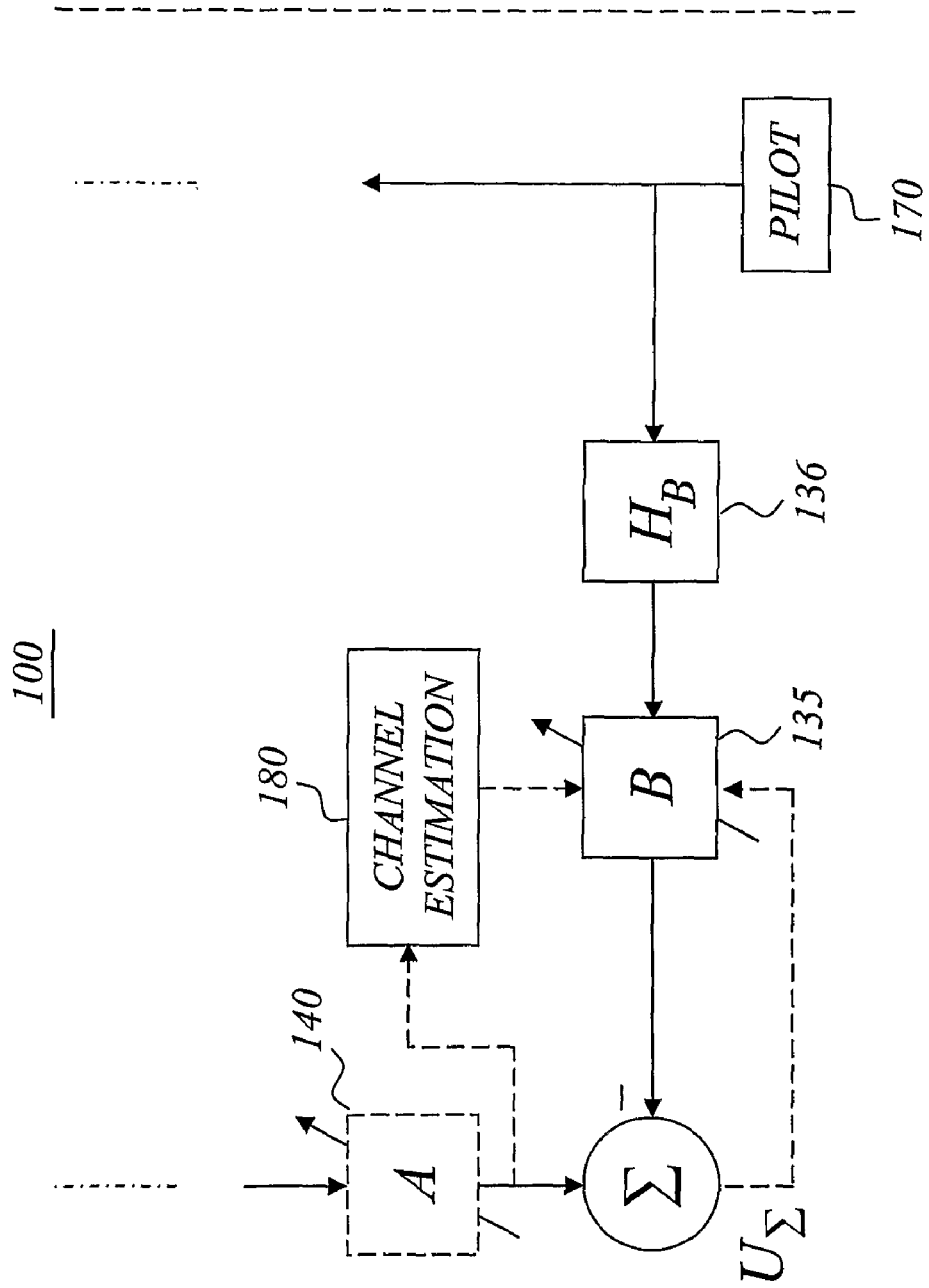
FIG. 9 is a schematic diagram illustrating an example of pilot-based adaptation of a self-interference cancellation filter according to a preferred embodiment of the invention.

FIG. 9 is a schematic diagram illustrating an example of pilot-based adaptation of a self-interference cancellation filter according to a preferred embodiment of the invention. In addition to the basic circuitry of FIGS. 3, 4, 5 and 7, the relay of FIG. 9 also includes a pilot generating module 170 as well as a channel (matrix) estimation module 180. In this context, an exemplary method for adapting matrix B may be based on temporarily stopping the relay from relaying and instead sending a (MIMO/MISO/SIMO) pilot signal (depending on the number of transmit and receive antennas) from the pilot module 170. A suitable general MIMO/MISO pilot scheme has been proposed in reference [14]. With reference to FIG. 9, this signal may be injected prior matrix $H_B$ (and $H_{C1}$). One could then estimate the channel after the matrix A by means of the channel estimation module 180, and set the matrix B to the estimated channel. Further adaptation of B could potentially also be based through examining the sum/(or rather difference due to negation at input) signal at $U_\Sigma$.

Figure 10:
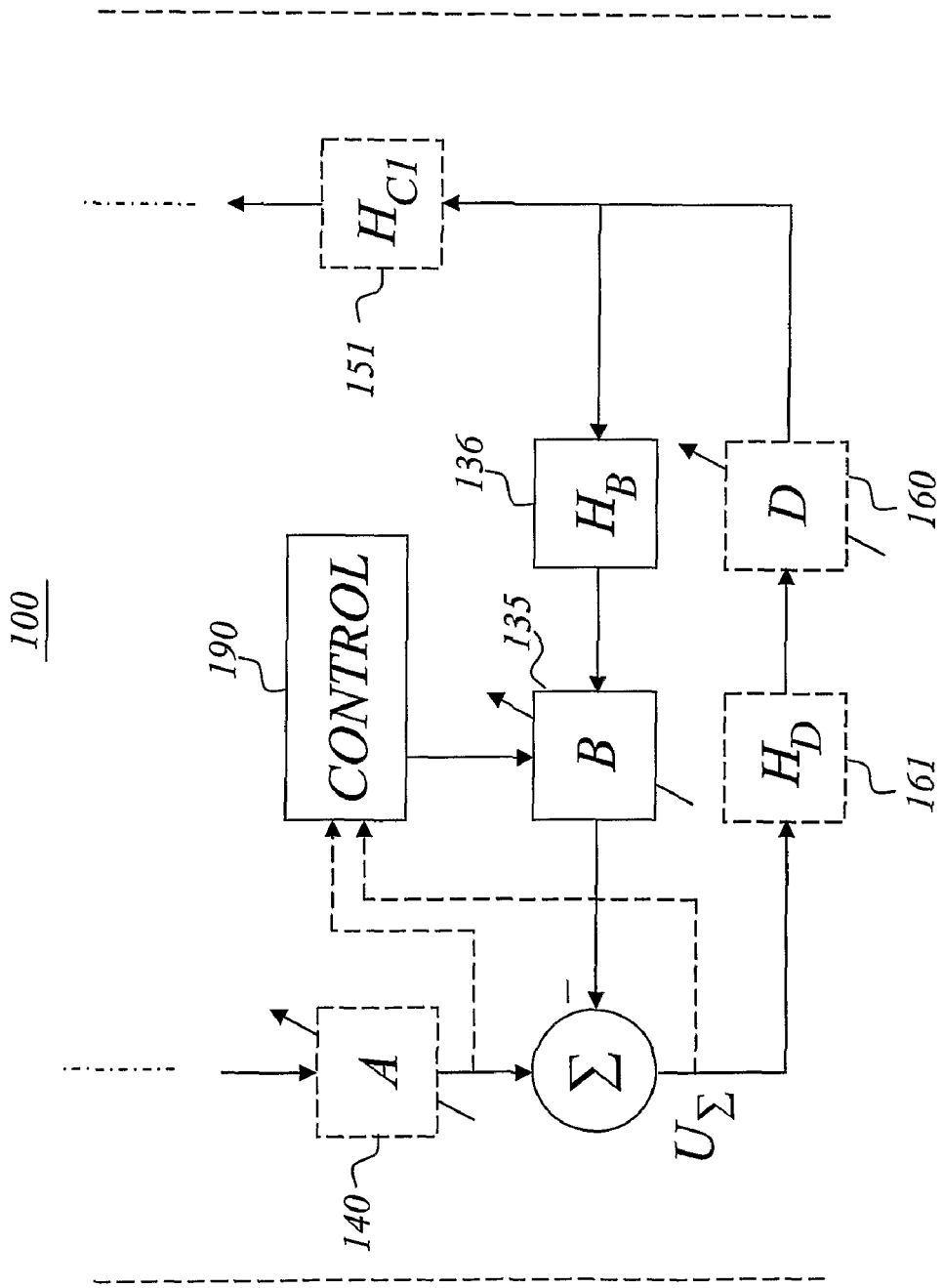
FIG. 10 is a diagram schematically illustrating an example of another principle of adapting a self-interference cancellation filter according to a preferred embodiment of the invention.

FIG. 10 is a diagram schematically illustrating an example of another principle of adapting a self-interference cancellation filter according to a preferred embodiment of the invention. In yet another variation of adapting B, the matrix B is continuously adapted to minimize the expectation value of the variance of the signal $U_\Sigma$. For this purpose a control module 190 is provided for performing the required calculations for minimization of the expectation value of the signal variance. Based on the calculations, an appropriate control signal is generated and sent for adaptation of the filter matrix B.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] J. N. Laneman, *Cooperative Diversity in Wireless Networks: Algorithms and Architectures*, Ph.D. Thesis, Massachusetts Institute of Technology, Cambridge, Mass., August 2002.
[2] U.S. Pat. No. 6,745,003
[3] U.S. Pat. No. 6,385,435
[4] U.S. Pat. No. 6,061,548
[5] U.S. Pat. No. 5,963,847
[6] U.S. Pat. No. 5,835,848
[7] http://www.wireless.co.il/var/295/10964-Show_Presentation_Final.pdf
[8] http://www.rfwindow.com/technology/use.htm
[9] http://www.juni.com.au/webnew/contents/products_sub28.asp
[10] http://www.mobilecomms-technology.com/contractors/inbuilding/jas/
[11] http://www.innoace.com/products02-10.htm
[12] http://www.rf-components.net/repeaters/RF20.php
[13] U.S. Patent Application Publication No. US 2005/0014464 A1, Peter Larsson, Jan. 20, 2005.
[14] U.S. Patent Application Publication No. US 2002/0118771 A1, Peter Larsson.

The invention claimed is:

1. A wireless relay node comprising:
a receiving side and a transmitting side for concurrent reception and transmission of an information stream, both said receiving side and said transmitting side having multiple antennas, where said receiving side is configured to receive
a Multiple Input Multiple Output (MIMO) signal representative of said information stream, said received MIMO signal having multiple MIMO sub-streams; and
a self-interference cancellation module configured to cancel signal feedback from a multi-antenna dependent feedback channel from said transmitting side to said receiving side based on a N×M dimensional filter matrix dependent on said multi-antenna dependent feedback channel, where at least one of N and M is greater than 1,
where said multi-antenna dependent feedback channel is represented by a $N_1 \times N_2$ dimensional channel matrix, where $N_1$ represents the number of receive antennas and $N_2$ represents the number of transmit antennas,
where said filter matrix is implemented in a filter arranged in an internal feedback path in connection with a forward path between said receiving side and said transmitting side of said relay node,
where said relay node further comprises a signal processing module comprising at least one antenna weight matrix arranged in said forward path, and values of said N×M dimensional filter matrix are modified by a transfer function of said at least one antenna weight matrix, and
where said signal processing module is configured to process said received MIMO signal such that the number of MIMO sub-streams of the processed signal for transmission at the transmitting side is at least greater than 1.

2. The wireless relay node of claim 1, where said at least one antenna weight matrix includes at least one of an antenna weight matrix for said receiving side and an antenna weight matrix for said transmitting side.

3. The wireless relay node of claim 2, where said at least one antenna weight matrix includes an antenna weight matrix for said receiving side, and values of said receiving side antenna weight matrix are modified dependent on the channel matrix between a transmitting node and said relay node.

4. The wireless relay node of claim 3, where said receiving side antenna weight matrix is configured to suppress interference from other nodes.

5. The wireless relay node of claim 2, where said at least one antenna weight matrix includes an antenna weight matrix for said transmitting side, and values of said transmitting side antenna weight matrix are modified dependent on the channel matrix between said relay node and a receiving node.

6. The wireless relay node of claim 5, where said transmitting side antenna weight matrix is configured to perform interference mitigation.

7. The wireless relay node of claim 2, where said at least one antenna weight matrix includes an antenna weight matrix for said receiving side and an antenna weight matrix for said transmitting side and said antenna weight matrices are selected jointly to maximize an overall capacity of communication between a transmitting node and a receiving node via said relay node.

8. The wireless relay node of claim 1, where said signal processing module is configured to perform at least one of beamforming, suppression of external interference, mitigation of generated interference, noise suppression, rank preservation, or optimization of performance of communication between a transmitting node and a receiving node via said relay node.

9. The wireless relay node of claim 1, where said relay node further comprises:
a channel estimation module configured to determine a channel matrix of said feedback channel based on a pilot signal inserted in said relay node, said channel estimation module further configured to adapt values of said N×M dimensional filter matrix based on said feedback channel matrix.

10. The wireless relay node of claim 1, where said receiving side and said transmitting side operate concurrently within the same frequency band.

11. The wireless relay node of claim 10, where said relay node is a multi-antenna on-frequency repeater.

12. A system comprising:
a relaying network comprising:
a wireless relay node that includes:
a receiving side and a transmitting side for concurrent reception and transmission of an information stream, both said receiving side and said transmitting side having multiple antennas, where said receiving side is configured to receive
a Multiple Input Multiple Output (MIMO) signal representative of said information stream, said received MIMO signal having multiple MIMO sub-streams; and a self-interference cancellation module configured to cancel signal feedback from a multi-antenna dependent feedback channel from said transmitting side to said receiving side based on a N×M dimensional filter matrix dependent on said multi-antenna dependent feedback channel, where at least one of N and M is greater than 1, where said multi-antenna dependent feedback channel is represented by a $N_1 \times N_2$ dimensional channel matrix, where $N_1$ represents the number of receive antennas and $N_2$ represents the number of transmit antennas, where said filter matrix is implemented in a filter arranged in an internal feedback path in connection with a forward path between said receiving side and said transmitting side of said relay node, where said relay node further comprises a signal processing module comprising at least one antenna weight matrix arranged in said forward path, and values of said N×M dimensional filter matrix are modified by a transfer function of said at least one antenna weight matrix, and where said signal processing module is configured to process said received MIMO signal such that the number of MIMO sub-streams of the processed signal for transmission at the transmitting side is at least greater than 1.

13. A self-interference cancellation filter for a wireless relay node, said relay node having a receiving side and a transmitting side for concurrent reception and transmission of an information stream, both said receiving side and said transmitting side having multiple antennas, said filter for arrangement in an internal feedback path in connection with a forward path having a signal processing module comprising at least one antenna weight matrix between said receiving side and said transmitting side of said relay node, and said filter is based on a N×M dimensional filter matrix that is dependent on a multi-antenna dependent feedback channel from said transmitting side to said receiving side of said relay node, where at least one of N and M is greater than 1, where said multi-antenna dependent feedback channel is represented by a $N_1 \times N_2$ dimensional channel matrix, where $N_1$ represents the number of receive antennas and $N_2$ represents the number of transmit antennas, and where said N×M dimensional filter matrix has values that are modified by a transfer function of said at least one antenna weight matrix.

14. The filter of claim 13, where said wireless relay node is an on-frequency relay node.

* * * * *

UNITED STATES PATENT AND TRADEMARK OFFICE
CERTIFICATE OF CORRECTION

PATENT NO. : 8,244,190 B2
APPLICATION NO. : 12/307259
DATED : August 14, 2012
INVENTOR(S) : Larsson et al.

Page 1 of 1

It is certified that error appears in the above-identified patent and that said Letters Patent is hereby corrected as shown below:

On the Title Page, in Field (75), under "Inventors", in Column 1, Line 2, delete "Ronninge" and insert -- Rönninge --, therefor.

In Column 5, Line 53, delete the second occurrence of "$N_1$" and insert -- N, --, therefor.

In Column 8, Line 23, delete "$H_B H_{Cl}$" and insert -- $H_B$, $H_{Cl}$, --, therefor.

In Column 10, Line 6, delete "$[U_2 T_2 V_2]$" and insert -- $[U_2 T_2 V_2^H]$ --, therefor.

Signed and Sealed this
Eighteenth Day of December, 2012

David J. Kappos
*Director of the United States Patent and Trademark Office*